(12) United States Patent
Hovland et al.

(10) Patent No.: US 8,126,307 B2
(45) Date of Patent: Feb. 28, 2012

(54) TELECOMMUNICATIONS CONNECTOR PROTECTIVE DEVICE

(75) Inventors: Jeffrey S. Hovland, Jordan, MN (US); Marlon E. Holmquist, Gibbon, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/548,091

(22) Filed: Aug. 26, 2009

(65) Prior Publication Data

US 2009/0310923 A1  Dec. 17, 2009

Related U.S. Application Data

(60) Division of application No. 11/644,322, filed on Dec. 21, 2006, now Pat. No. 7,588,375, which is a continuation of application No. 10/750,380, filed on Dec. 29, 2003, now Pat. No. 7,186,038.

(51) Int. Cl.
*G02B 6/00* (2006.01)
(52) U.S. Cl. ........................................................ 385/139
(58) Field of Classification Search .................. 385/139
See application file for complete search history.

(56) References Cited

U.S. PATENT DOCUMENTS 2,231,919 A    2/1941   Kent
(Continued)

FOREIGN PATENT DOCUMENTS

DE    42 00 865 A1    7/1993
(Continued)

OTHER PUBLICATIONS

"Fiber Optic Cables: do's and don'ts, Modern Office Technology", vol. 33, No. 9, pp. 38-39 (Sep. 1988).
(Continued)

*Primary Examiner* — Omar Rojas
(74) *Attorney, Agent, or Firm* — Merchant & Gould P.C.

(57) ABSTRACT

A fiber optic connector assembly includes a fiber optic connector mounted to a fiber optic cable having a ferrule with an end face terminating an optical fiber. The fiber optic cable is terminated with the fiber optic connector in a clean environment protected against airborne contaminants. A seal is placed about the ferrule within the clean environment to protect the polished end face of the ferrule including the end of the optical fiber against airborne contaminants. The seal is removable to make a fiber optic communications linkage without cleaning the end face of the optical ferrule.

18 Claims, 6 Drawing Sheets

U.S. PATENT DOCUMENTS

| | | | |
|---|---|---|---|
| 3,672,006 A | 6/1972 | Fidrych | |
| 3,858,848 A | 1/1975 | MacFetrich | |
| 3,906,619 A | 9/1975 | Shaffer | |
| 3,935,960 A | 2/1976 | Cornell | |
| 4,368,910 A | 1/1983 | Fidrych | |
| 4,453,291 A | 6/1984 | Fidrych | |
| 4,460,159 A | 7/1984 | Charlebois et al. | |
| 4,557,505 A | 12/1985 | Schaefer et al. | |
| 4,684,161 A | 8/1987 | Egner et al. | |
| 4,684,211 A | 8/1987 | Weber et al. | |
| 4,731,032 A | 3/1988 | Noorily | |
| 4,736,978 A | 4/1988 | Cielker | |
| 5,013,125 A | 5/1991 | Nilsson et al. | |
| 5,039,196 A | 8/1991 | Nilsson | |
| 5,067,843 A | 11/1991 | Nova | |
| 5,122,007 A | 6/1992 | Smith | |
| 5,133,583 A | 7/1992 | Wagman et al. | |
| 5,185,825 A * | 2/1993 | Shigematsu et al. | 385/20 |
| 5,245,730 A | 9/1993 | Martin | |
| 5,283,930 A | 2/1994 | Krauss | |
| 5,308,026 A | 5/1994 | Shaw | |
| 5,480,203 A | 1/1996 | Favalora et al. | |
| 5,520,041 A | 5/1996 | Haswell | |
| 5,863,083 A | 1/1999 | Giebel et al. | |
| 5,938,180 A | 8/1999 | Walsten | |
| 6,088,501 A | 7/2000 | Delrosso | |
| 6,088,502 A | 7/2000 | Faist et al. | |
| 6,101,307 A | 8/2000 | Heimuller et al. | |
| 6,104,855 A | 8/2000 | Jeon | |
| 6,113,280 A | 9/2000 | Nagaoka et al. | |
| 6,161,688 A | 12/2000 | Weber | |
| 6,163,641 A * | 12/2000 | Eastgate | 385/125 |
| 6,188,825 B1 | 2/2001 | Bandy et al. | |
| 6,206,577 B1 | 3/2001 | Hall, III et al. | |
| 6,215,944 B1 | 4/2001 | Ota et al. | |
| 6,217,233 B1 | 4/2001 | Eslambolchi et al. | |
| 6,220,765 B1 | 4/2001 | Tatoh | |
| 6,220,766 B1 | 4/2001 | Yeandle et al. | |
| 6,220,767 B1 | 4/2001 | Bookbinder | |
| 6,227,717 B1 | 5/2001 | Ott et al. | |
| 6,227,724 B1 | 5/2001 | Verdiell | |
| 6,234,686 B1 | 5/2001 | Tonai et al. | |
| 6,244,756 B1 | 6/2001 | Bloom | |
| 6,247,849 B1 | 6/2001 | Liu | |
| 6,252,726 B1 | 6/2001 | Verdiell | |
| 6,257,773 B1 | 7/2001 | Moriyama et al. | |
| 6,261,006 B1 | 7/2001 | Selfridge | |
| 6,266,469 B1 | 7/2001 | Roth | |
| 6,269,209 B1 | 7/2001 | Terada et al. | |
| 6,280,101 B1 | 8/2001 | Tournereau et al. | |
| 6,280,102 B1 | 8/2001 | Go | |
| 6,282,350 B1 | 8/2001 | Takahashi et al. | |
| 6,282,352 B1 | 8/2001 | Kato et al. | |
| 6,296,400 B1 | 10/2001 | Uchiyama et al. | |
| 6,312,167 B1 | 11/2001 | Kim et al. | |
| 6,318,906 B1 | 11/2001 | Ishizaka | |
| 6,318,910 B1 | 11/2001 | Higashikawa | |
| 6,328,485 B1 | 12/2001 | Hotta | |
| 6,332,720 B1 | 12/2001 | Shimaoka et al. | |
| 6,341,898 B1 | 1/2002 | Matsushita | |
| 6,396,993 B1 | 5/2002 | Giebel et al. | |
| 6,398,422 B1 | 6/2002 | Szilagyi et al. | |
| 6,547,450 B2 * | 4/2003 | Lampert | 385/78 |
| 6,712,524 B2 | 3/2004 | Beatty et al. | |
| 6,719,274 B2 | 4/2004 | Bowling | |
| 6,993,237 B2 | 1/2006 | Cooke et al. | |
| 7,186,038 B2 | 3/2007 | Hovland et al. | |
| 7,246,789 B2 | 7/2007 | Ames et al. | |
| 7,376,312 B2 * | 5/2008 | Nawae et al. | 385/49 |
| 2003/0202766 A1 * | 10/2003 | Medalsy et al. | 385/135 |
| 2006/0133748 A1 | 6/2006 | Seddon et al. | |
| 2009/0238534 A1 | 9/2009 | Ahmed | |
| 2010/0316347 A1 | 12/2010 | Kowalczyk et al. | |
| 2010/0322584 A1 | 12/2010 | Kowalczyk et al. | |

FOREIGN PATENT DOCUMENTS

| | | |
|---|---|---|
| DE | 20308264 | 9/2003 |
| EP | 1172671 | 1/2002 |
| JP | 61-84613 | 4/1986 |
| JP | 2-278216 | 11/1990 |
| JP | 4-288508 | 10/1992 |
| JP | 8-240756 | 9/1996 |
| JP | 8-292331 | 11/1996 |
| JP | 9-152536 | 6/1997 |
| JP | 9-152537 | 6/1997 |
| JP | 2000241692 | 9/2000 |
| JP | 2001-27720 | 1/2001 |
| JP | 2001116950 | 4/2001 |
| JP | 2003-337258 | 11/2003 |
| JP | 2006-235502 | 9/2006 |
| WO | WO 2005/072395 A2 | 8/2005 |

OTHER PUBLICATIONS

ADC Telecommunications, Inc., Dust Cap for Fiber Optic Connectors (1 page) (admitted as prior art as of Dec. 29, 2003).

Kowalczyk et al., U.S. Appl. No. 12/775,011, filed May 6, 2010, titled "Cable Pulling Assembly."

Kowalczyk et al., U.S. Appl. No. 12/779,198 , filed May 13, 2010, titled "Cable Pulling Assembly."

* cited by examiner

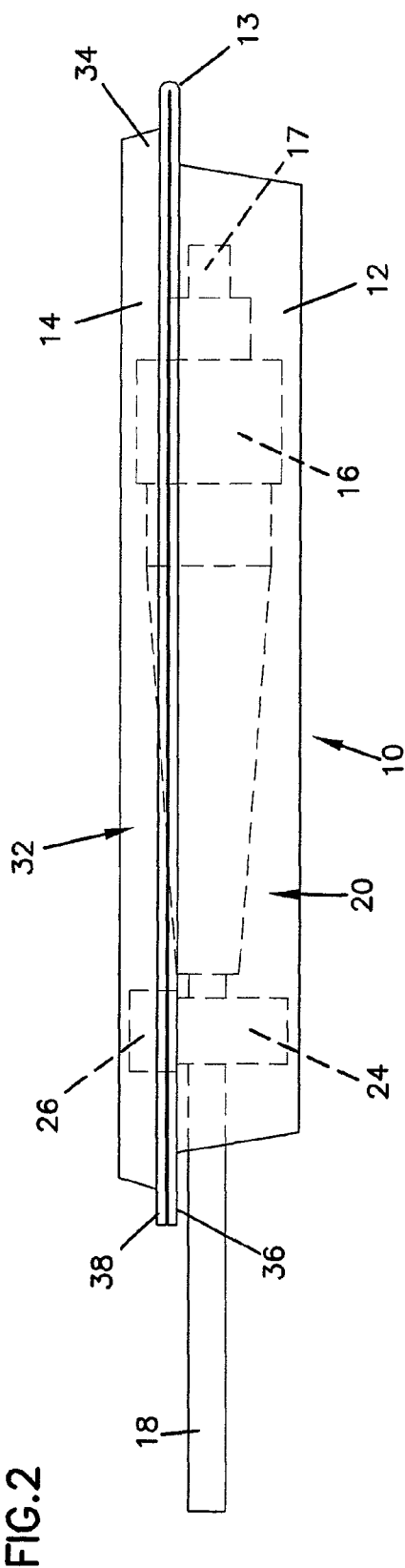
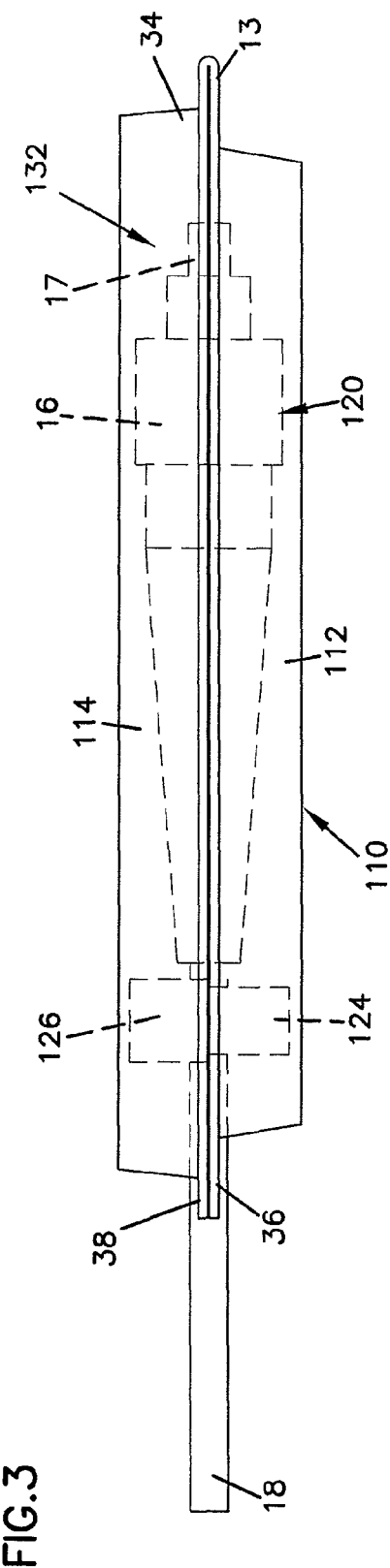

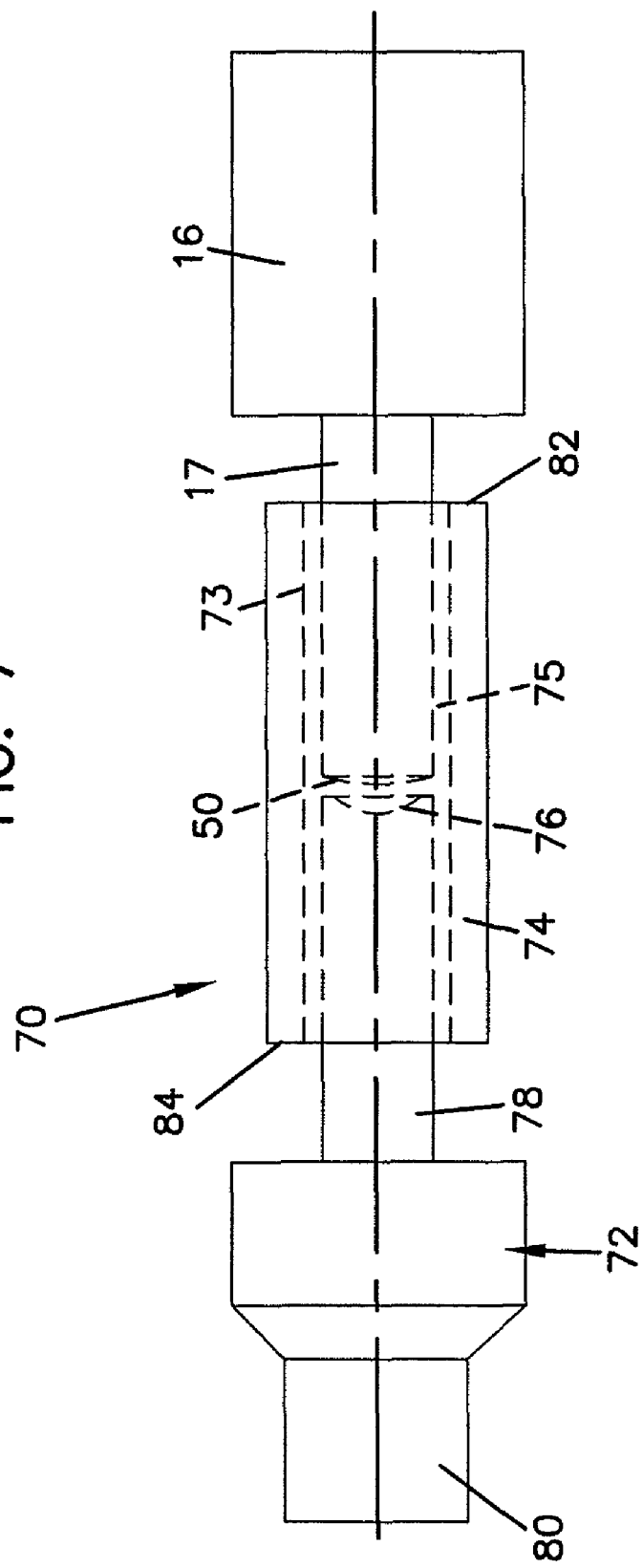

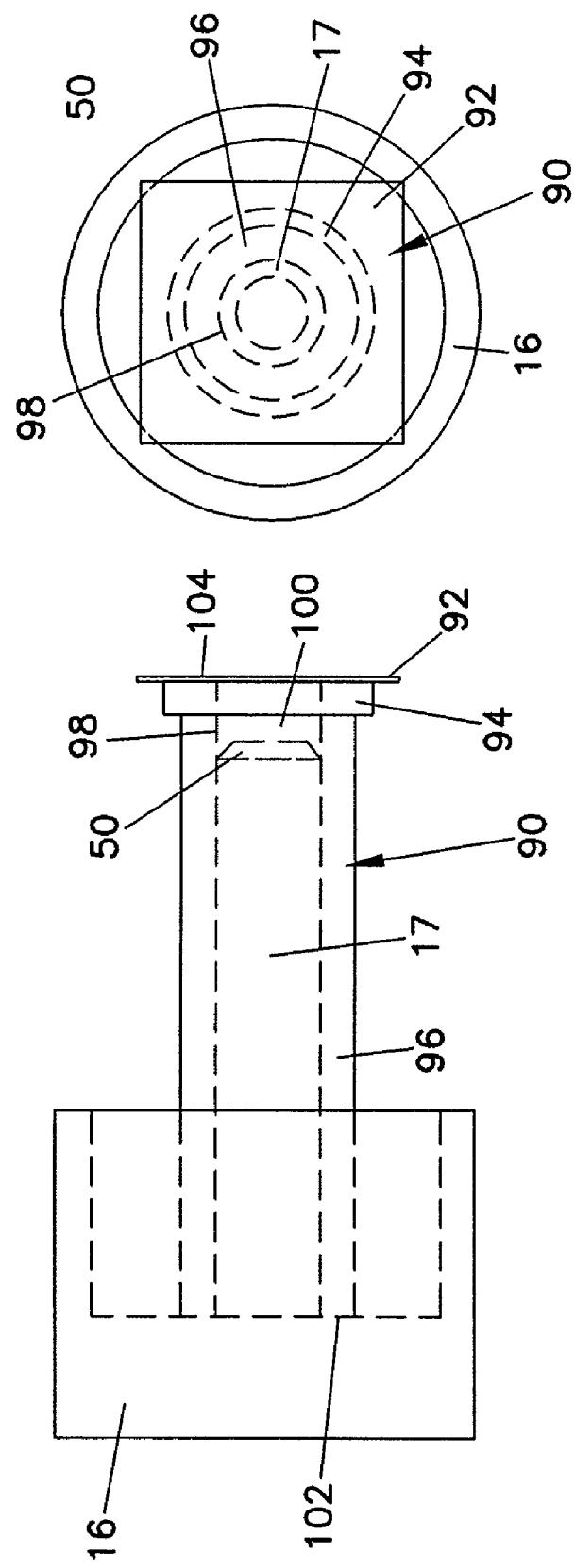

TELECOMMUNICATIONS CONNECTOR PROTECTIVE DEVICE

CROSS REFERENCE TO RELATED APPLICATIONS

This application is a divisional of application Ser. No. 11/644,322, filed Dec. 21, 2006, now U.S. Pat. No. 7,588,375, which is a continuation of application Ser. No. 10/750,380, filed Dec. 29, 2003, now U.S. Pat. No. 7,186,038, issued Mar. 6, 2007, which applications are incorporated herein by reference in its entirety.

TECHNICAL FIELD

The present invention relates generally to protective devices for telecommunications connectors.

BACKGROUND

Telecommunications cables are often pre-terminated by a manufacturer or a supplier. These pre-terminated cables may be configured to standard or customs lengths and may have one or both ends terminated. The connectors attached to the ends of these cables may be susceptible to damage or contamination during transportation from the manufacturer or supplier to a warehouse, storage facility or installation site. Damage to these connectors and cable ends may result in lost time to repair the connectors as well as possible signal degradation.

Improvements to protecting the ends of telecommunications cable connectors are desirable.

SUMMARY

The present invention relates to a cover assembly for a fiber optic connector mounted to an end of and terminating a fiber optic cable. The cover includes an open sided box and a lid sized to engage the open side. The box and the lid define a cavity sized to fit about and receive a fiber optic connector. The cavity has an open end adapted to receive the optical fiber cable. The fiber optic connector is held within the cavity and the cable extends through the open end, with the lid engaging the open side and sealing the cavity from contaminants outside the cavity.

Further, the present invention relates to a fiber optic connector assembly with a fiber optic connector mounted to a fiber optic cable and including a ferrule with an end face terminating the fiber. A plug is configured to fit about and engage the ferrule of the fiber optic connector to seal the end face from contaminants. An adhesive tape is releasably attached to the connector about the plug, holding the plug to the connector.

Further, the present invention relates to a sleeve, the first end of which fits about a ferrule of a telecommunications connector with the end face of the ferrule within an axial opening of the sleeve. A plug is inserted into a second opposing end of the sleeve. The sleeve fits closely about both the ferrule and the plug to prevent entry of airborne contaminants into the axial opening through either end.

Still further, the present invention relates to a body including an axial opening with a first end and an opposing second end. A ferrule of a fiber optic connector is placed within the axial opening through the first end so that a polished end face of the ferrule is within the axial opening. A removable adhesive sealing member is placed over the second end of the axial opening. The body fits about the ferrule to prevent entry of airborne contaminants into the axial opening through the first end and the sealing member prevents entry of airborne contaminants into the axial opening through the second end.

The present invention also relates to a method of sealing a telecommunications connector against airborne contaminants comprising terminating a fiber optic cable with a fiber optic connector in a clean environment protected against airborne contaminants. An end of an optical fiber within the cable is terminated at a polished end face of a ferrule of the connector. Within the clean environment, a seal is placed about the ferrule to protect the polished end face of the ferrule including the end of the optical fiber against airborne contaminants. The connector is then transported to a location where a fiber optic communications linkage is desired. The seal is then removed from the connector and the communications linkage is made without cleaning the end face of the connector.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 2 is a side view of the protective device of FIG. 1 with the lid closed and the foam sealing blocks and the telecommunications cable and connector indicated with dashed lines.

FIG. 3 is a side view of a second embodiment of a telecommunications connector protective device according to the present invention with the lid closed and the foam sealing blocks and the telecommunications cable and connector indicated with dashed lines.

FIG. 7 is a side view of a fourth embodiment of a telecommunications connector protective device.

FIG. 8 is a side view of a fifth embodiment of a telecommunications connector protective device.

FIG. 9 is an end view of the protective device of FIG. 8.

DETAILED DESCRIPTION

Reference will now be made in detail to exemplary aspects of the present invention which are illustrated in the accompanying drawings. Wherever possible, the same reference numbers will be used throughout the drawings to refer to the same or similar parts.

When a telecommunications connector is installed in an operational environment, dust and other contaminants may degrade the level of signal that is transmitted through the connector and the communications circuit to which the connector is attached. These contaminants may be introduced into the communication circuit at any time from when the connector is assembled (such as in a factory) to when the connector is inserted within a mating adapter (such as in an interconnect panel or other connection device). By assembling connectors in a relatively clean factory environment and providing a secure and removable shield for the connector, the potential for contaminants being introduced into such a communications circuit may be minimized.

Figure 1:
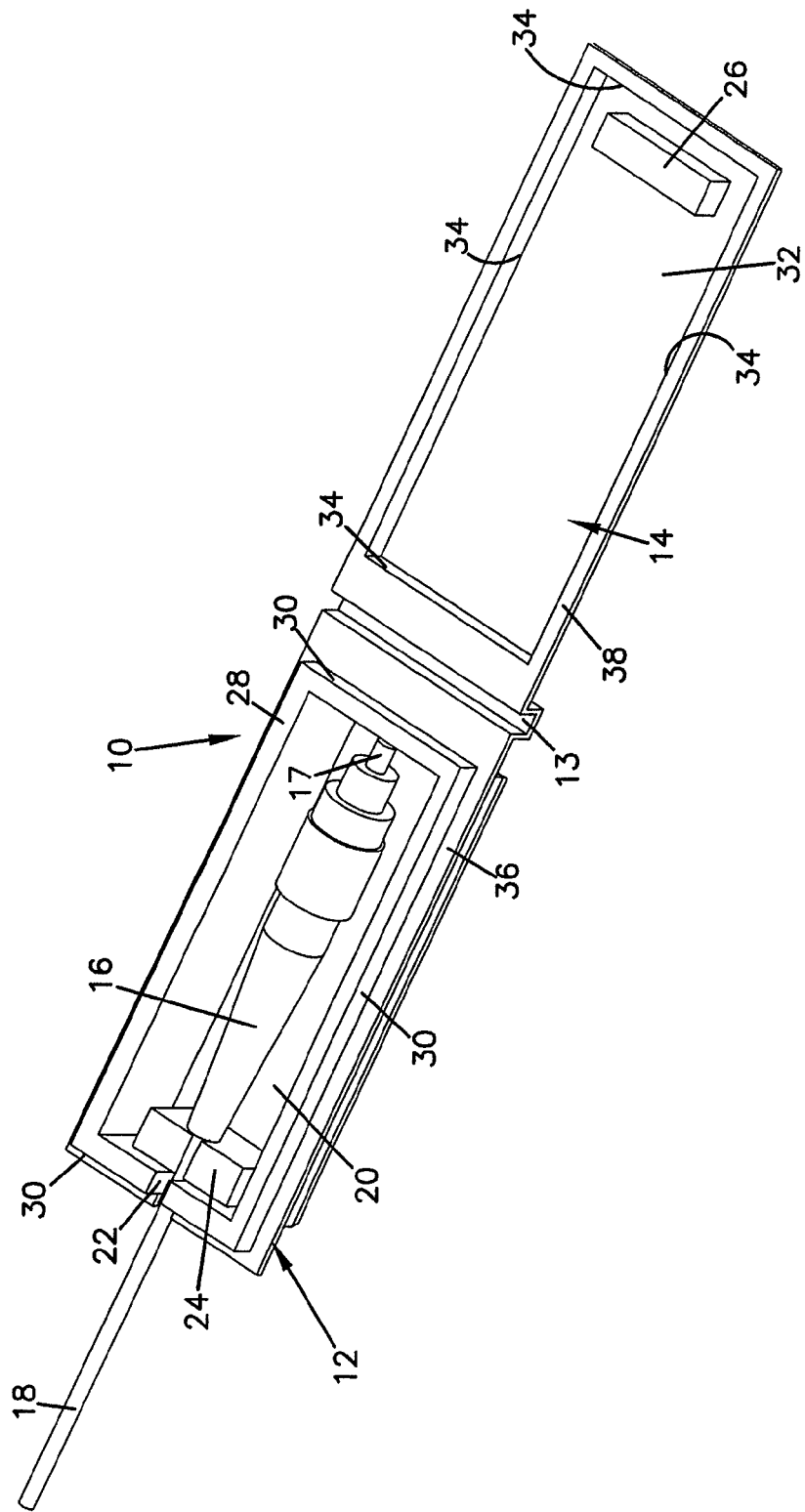
FIG. 1 is a perspective view of a telecommunications connector clamshell protective device according to the present invention.

Referring now to FIG. 1, a telecommunications connector 16 is shown within a clamshell protective device 10. Clamshell device 10 includes a box 12 and a lid 14 hingedly mounted to each other by hinge 13. Alternatively, box 12 and lid 14 may be separate elements without hinge 13 or other connection extending between them. Connector 16 is mounted to the end of and terminates a telecommunications cable 18. As shown, connector 16 is an optical fiber connector commonly referred to as an FC connector and cable 18 is an optical fiber cable including a strand of optical fiber terminated at a ferrule 17. Other styles and formats of optical fiber connectors and high speed copper connectors are also contemplated within the scope of the present invention. The amount of data that may be transmitted through any of these connector types may be impeded by contaminants and use of a protective device such as device 10 may provide protection from the introduction of such contaminants.

Connector 16 is received within a recess 20 of box 12. A slot 22 receives cable 18. In FIG. 1, the slot 22 is open-ended. Cable 18 also passes across a first foam block 24 mounted within recess 20 adjacent slot 22. Block 24 may be formed of a deformable resilient foam to permit block 24 to conform the diameter of cable 18 and prevent entry of contaminants into recess 20 through slot 22. A mating foam block 26 is included on lid 14 which cooperates with block 24 to assist in sealing around cable 18. Alternatively, either of blocks 24 or 26 may be made of a material capable of conforming to the full diameter of cable 18 so that the other mating block may be formed of a relatively non-deformable material. The non-deformable block may be integrally formed as part of either lid 14 or box 12 so that fewer components are needed to assemble device 10.

Block 26 is within a mating recess 32 of lid 14. Recess 32 includes perimeter walls 34 extending about lid 14. Walls 34 engage mating surfaces 30 of box 12 about recess 20 and cooperate to seal recesses 32 and 20 against contaminants reaching connector 16 when device 10 is closed as shown in FIG. 2. Walls 34 and mating surfaces 30 may be snap fit with each other when lid 14 is mated with box 12, as shown in FIG. 2, and the snap fit may be close enough to prevent entry of contaminants. Alternatively, walls 34 and mating surfaces 30 may be bonded to each other, such as with glue, heat sealing, ultrasonic welding or other techniques, to provide additional protection against the entry of contaminants. FIG. 2 also shows foam blocks 24 and 26 of protective device 10 of FIG. 1 cooperating to seal about cable 18 to prevent entry of contaminants into device 10.

Adjacent mating surfaces 30 about recess 20 are flanges 36. Adjacent perimeter walls 34 about recess 32 are flanges 38. As an alternative to bonding perimeter walls 34 to mating surfaces 30, flanges 32 and 34 may be bonded to each other, such as with glue, heat sealing, ultrasonic welding or other techniques.

Referring now to FIG. 3, a second embodiment of a protective device 110 is shown with a lid 114 and a box 112 connected by hinge 13. Device 110 differs from device 10 in that box 12 and lid 14 are approximately equal in depth, whereas box 12 is substantially deeper than lid 14. Recess 32 of lid 14, as shown in FIG. 2, may only extend to the depth needed to define perimeter walls 34. Recess 132 of lid 114 extends to a greater depth than required to define perimeter walls 34, as shown in FIG. 3. As shown in FIG. 2, connector 16 is positioned substantially within recess 20 of box 12 and only a small portion of connector 16 extends within recess 32 of box 14. As shown in FIG. 3, connector 16 extends within both recess 132 and a recess 120 of box 112 approximately equally. A pair of foam blocks 124 and 126 are positioned adjacent an end of device 110 opposite hinge 13 to permit entry of cable 18 into device 110 and to seal about cable 18 against the entry of contaminants.

While devices 10 and 110 protect an end of cable 18 terminated at ferrule 17 from contaminants as described above, these devices also provide some protection from impact or other physical damage that may adversely affect the ability of connector 16 to interface with other elements of the telecommunications circuit. As is well known in the prior art, telecommunications connectors such as connector 16 include features which mate with adapters or other components and which may provide a secure and sealed interface for the transmission of signals, either optical or electrical. These mating features also need to be protected from contaminants as well as from physical damage. Devices 10 and 110 provide protection to these mating and locking features of connector 16 as well as to ferrule or cable termination 17.

Figure 4:
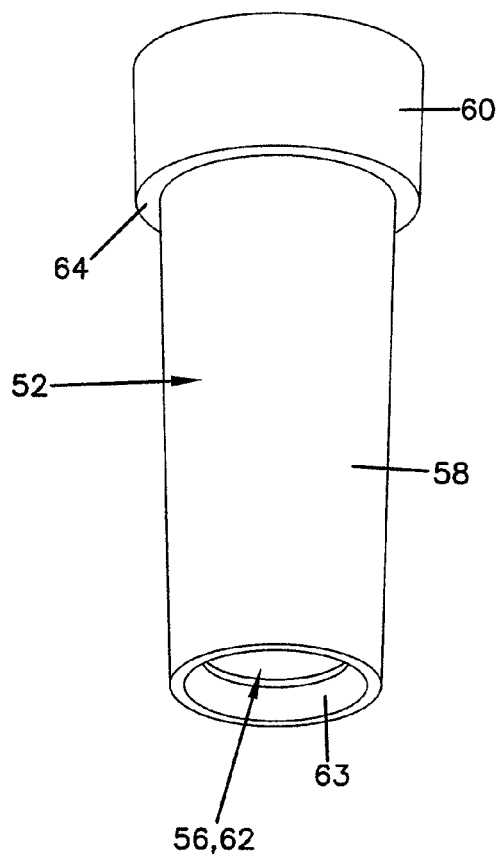
FIG. 4 is a perspective view of a third embodiment of a telecommunications connector plug protective device according to the present invention.
Figure 6:
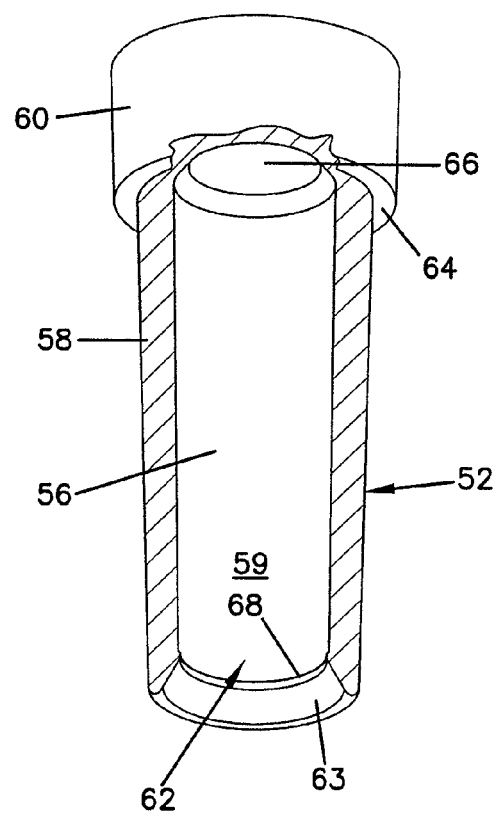
FIG. 6 is a partial cross-sectional view of the protective device of FIG. 4.
Figure 5:
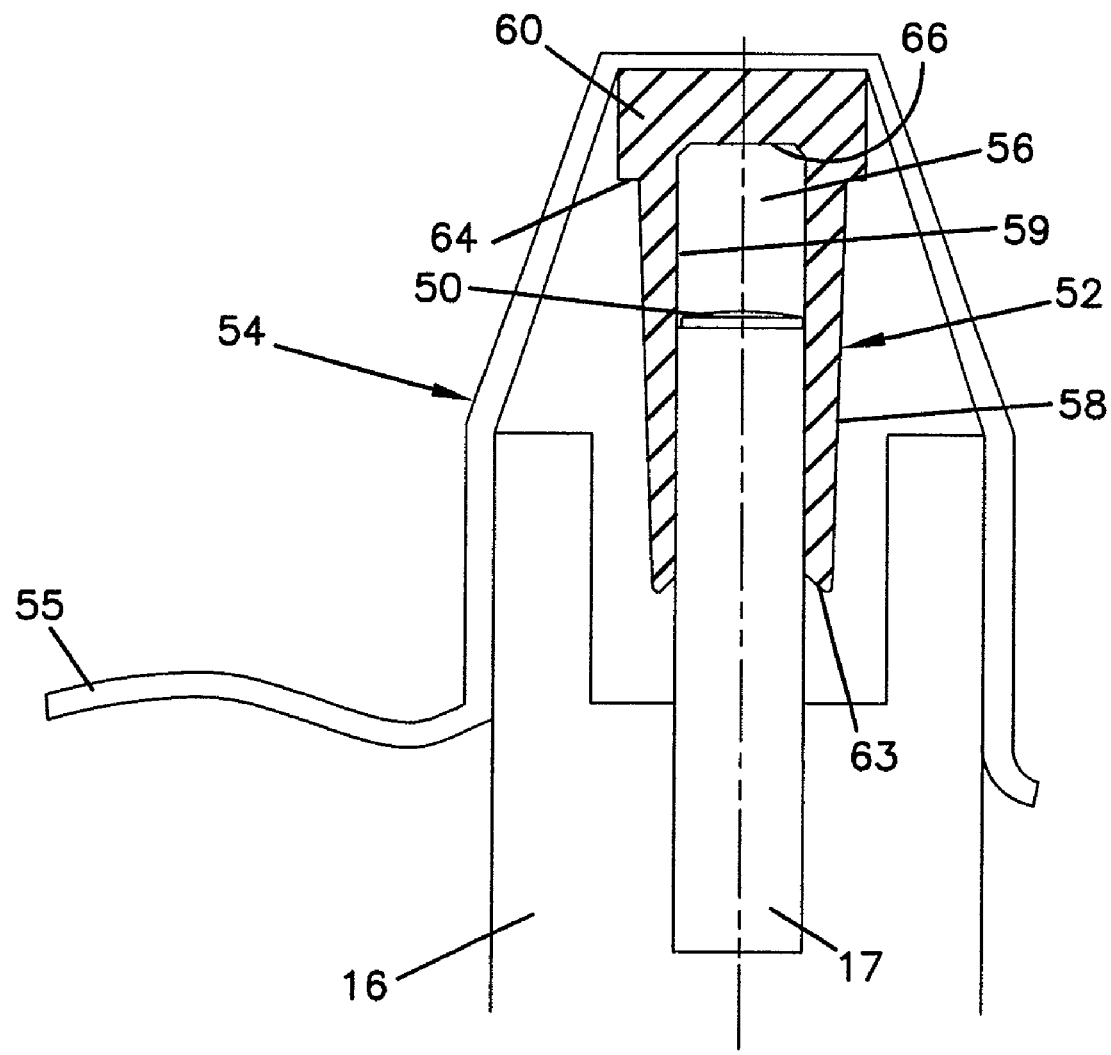
FIG. 5 is a cross-sectional view of the protective device of FIG. 4 mounted on a fiber optic connector.

Referring now to FIGS. 4 to 6, a plug protective device 52 for protecting an end face 50 of ferrule 17 of telecommunications connector 16 is shown. Plug 52 includes a body 58 and a larger diameter portion 60 defining a shoulder 64 between. An inner cylindrical opening 56 is defined within plug 52 for receiving and sealing about ferrule 17. When plug 52 is positioned about ferrule 17 as shown in FIG. 5, the seal between an inner wall 59 of body 58 within a cylindrical cavity 56 forms an air-tight seal, so that air is compressed within cavity 56 between end face 50 and an inner end wall 66. To prevent this compressed air from forcing plug 52 from about ferrule 17 and allowing contaminants to come into contact with end face 50, a tape 54 is positioned about plug 52 to hold plug 52 to connector 16. Tape 54 may include an anti-tamper feature which will indicate of tape 54 has been removed and replaced or otherwise disturbed. If this anti-tamper feature indicates that tape 54 has been disturbed, this may indicate the seal between plug 52 and ferrule 17 has been broken and that end face 50 may have been exposed to contaminants. Tape 54 may also be mounted to connector 16 and plug 52 with a tail 55 to facilitate the removal of tape 54 and plug 52 from connector 16.

As shown, ferrule 17 is inserted within cavity 56 of plug 52 through an opening 62. To assist in the alignment and entry of ferrule 17 into cavity 56, a tapered entry 63 into opening 62 may be provided. At the inner end of taper 63, adjacent inner wall 59, a smaller diameter ledge 68 is formed. It is anticipated that plug 52 will be made of a resilient deformable material such as a thermoplastic elastomer. Ledge 68 should promote the formation of an airtight seal about ferrule 17 by deforming to closely match the outer surface of ferrule 17 as plug 52 is mounted to connector 16. Ledge 68 may also serve to brush off surface contaminants from the outer surface of ferrule 17 as plug 52 is placed about ferrule 17 and ensure that these contaminants do not enter cavity 56. Shoulder 64 provides a finger hold to aid in the removal of plug 52 from connector 16.

Referring now to FIG. 7, a fourth embodiment of a protective device 70 includes a plug 72 and a sleeve 74. A first end 82 of sleeve 74 is sized to be received about ferrule 17 of connector 16 so that end face 50 is within an axial opening 75 of sleeve 74. Axial opening 75 is defined by an interior wall 73. In FIG. 7, axial opening 75 is shown enlarged greater than the diameter of ferrule 17 for clarity. However, axial opening 75 is sized to fit closely to ferrule 17 to prevent contaminants from passing through first end 82 along ferrule 17 to reach end face 50. As shown, axial opening 75 is consistent in diameter from first end 82 to a second end 84. Plug 72 includes a shaft 78 which similarly sized to ferrule 17 and is inserted through second end 84 into axial opening 75. Shaft 78 includes a mating portion 76 sized and shaped to approximate the polished shape of end face 50. Mating portion 76, as shown, is concave and forms a contour to match the polished convex shape of end face 50. Mating portion 76 is shown offset from end face 50 for clarity in FIG. 7. However, in use, mating portion 76 will be in close proximity or contact with end face 50 to further provide protection against contaminants reaching end face 50.

Other polish profiles for end face 50 are known and it is anticipated that mating portion 76 may be shaped as appropriate to match these known polish profiles. It is also anticipated that mating portion 76 may be shaped to match new polish profiles that may be developed, within the scope of the present invention. Plug 72 also includes an enlarged end 80 opposite shaft 78. Enlarged end 80 provides a finger grip for removing device 70 from ferrule 17 of connector 16.

As shown, mating end 76 is offset from end face 50 for clarity. However, end face 50 and mating face 76 would be positioned directly adjacent each other so that mating face 76 may block contaminants from reaching end face 50. As axial opening 75 is uniform in diameter and shaft 78 is similarly sized to ferrule 17, contaminants are prevented from entering axial opening 75 through second end 84 as well.

Referring now to FIGS. 8 and 9, a fifth embodiment of a protective device 90 includes a body 96 with a flange 94 at a second end 104. Body 96 includes an inner wall 98 which defines an interior opening 100 extending between a first end 102 and second end 104. Interior opening 100 is sized to be received about ferrule 17 so that end face 50 is within opening 100 and inner wall 98 fits closely about ferrule 17 to prevent contaminants from entering opening 100 through first end 102. With such an air-tight or near air-tight seal between ferrule 17 and inner wall 98, second end 104 of body 96 is open to permit ferrule 17 to be inserted within opening 100 and allowing displaced air to escape. Once ferrule 17 has been placed within opening 100, an adhesive member 92, such as tape, is then placed across end 104 to provide an air-tight seal of second end 104 and prevent contaminants from entering opening 100 through second end 104.

As shown, member 92 extends beyond a flanged portion 94 of body 96, so that member 92 may be removed to permit protective device 90 to be withdrawn from ferrule 17. Flanged portion 94 provides a finger grip to aid in the removal of body 96 from ferrule 17. Alternatively, member 92 could be sized to more closely match the size and shape of flanged portion 94 with a single tab extending beyond flanged portion 94 to permit removal of member 92.

While several embodiments of protective devices have been described herein, a generalized procedure for protecting telecommunications connectors from airborne contaminants applicable to many of these embodiments is within the scope of the present invention as well. This generalized procedure begins with a fiber optic cable being terminated with a fiber optic connector in a clean factory environment. An optical fiber within the cable is positioned within a ferrule of the connector and an end face of the ferrule and the end of the fiber adjacent the end face are polished to the desired polish profile. Once the end face has been finished and before the connector is removed from the clean factory environment, a seal is applied to the connector to protect the end face from airborne contaminants.

The protection procedure also includes transporting the protected connector to a location where a fiber optic communications linkage is desired. This location may be in an environment where the air is not as protected from airborne contaminants as the factory environment. Further, during transportation or storage, it is desirable that the end face of the connector be protected from airborne or other contaminants as well. Once at the location of the desired telecommunications connection, the seal may be removed from the connector and the linkage may be completed without the need for cleaning of the end face in the field.

The creation of the seal about the end face and removal of the seal prior to making the linkage may be performed by the methods and devices described above.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is as follows:

1. A cover assembly for a fiber optic connector comprising:
the fiber optic connector mounted to an end of and terminating a fiber optic cable, the fiber optic connector including a ferrule at a first end of the fiber optic connector and the fiber optic cable extending from a second end of the fiber optic connector;
a cover including a box and a lid that cooperate to define a cavity that is sized and configured to receive the fiber optic connector, the lid engaging the box with a snap-fit connection, the cover also defining an opening on only one side of the cover, the fiber optic cable extending through the opening when the fiber optic connector is received within the cavity, the box and the lid being configured to seal together to inhibit contamination of the ferrule of the fiber optic connector from outside the cover.

2. The cover assembly of claim 1, wherein the box includes mating surfaces that define an open end of the box; wherein the lid includes perimeter walls defining a recess; and wherein the perimeter walls of the lid engage the mating surfaces of the box with the snap-fit connection.

3. The cover assembly of claim 1, wherein the lid and the box are pivotally connected by a living hinge.

4. The cover assembly of claim 3, wherein the cover has a first end and a second end, wherein the opening through which the fiber optic cable extends is located at the first end and wherein the living hinge is located at the second end.

5. The cover assembly of claim 1, wherein the box includes a strip of resilient deformable material adjacent the opening through which the fiber optic cable extends, the deformable material cooperating with the lid to form a seal about the fiber optic cable.

6. The cover assembly of claim 1, wherein the lid includes a strip of resilient deformable material adjacent the opening through which the fiber optic cable extends, the deformable material cooperating with the box to form a seal about the fiber optic cable.

7. The cover assembly of claim 5, wherein the lid includes a second strip of resilient deformable material adjacent the opening through which the fiber optic cable extends, the strip of deformable material being configured to engage the second strip of deformable material so that the fiber optic cable extends between the strip and the second strip, and the strips of deformable material cooperating to form a seal about the fiber optic cable.

8. The cover assembly of claim 1, wherein the box and the lid are joined to each other by a heat-sealed edge about the cavity of the cover.

9. The cover assembly of claim 1, wherein the cavity is formed within the box and the lid is a predominantly flat member closing off an open side of the box.

10. The cover assembly of claim 1, wherein the box and the lid have substantially equal depth.

11. A method of sealing a telecommunications connector against airborne contaminants comprising:

providing a telecommunications connector with which a fiber optic cable was terminated in a clean environment protected against airborne contaminants, wherein an end of an optical fiber within the cable is terminated at a polished end face of a ferrule at a first end the fiber optic connector and the optical fiber extends from a second end of the fiber optic connector, the fiber optic connector having been placed within a cover within the clean environment, the cover including an open sided box and a lid, the lid being sized to fit within the open side of the box and to seal a cavity defined by the lid and the box against entry of airborne contaminants, and the fiber optic cable having been routed out of the cavity through an open-ended slot defined in the cover and the cover having been closed by engaging the lid with the open side of the box without placing another fiber optic connector within the cover, wherein the cover closes the open-ended slot when closed;

transporting the telecommunications connector to a location where a fiber optic communications linkage is desired;

removing the cover from the fiber optic connector; and making the fiber optic communications linkage without cleaning the end face of the ferrule.

12. The method of claim 11, wherein closing the cover comprises pivoting the lid relative to the cover from an open position to a closed position.

13. The method of claim 11, wherein closing the cover comprises bonding the lid to the box.

14. The method of claim 13, wherein bonding the lid to the box comprises heat sealing the lid to the box.

15. A cover assembly for a fiber optic connector comprising:

the fiber optic connector mounted to an end of and terminating a fiber optic cable, the fiber optic connector including a ferrule;

a cover including a box and a lid that cooperate to define a cavity that is sized and configured to receive the fiber optic connector, the cover also defining an opening through which the fiber optic cable extends when the fiber optic connector is received within the cavity, the box and the lid being configured to seal together to inhibit contamination of the ferrule of the fiber optic connector from outside the cover;

wherein the box includes a strip of resilient deformable material adjacent the opening through which the fiber optic cable extends, the deformable material cooperating with the lid to form a seal about the fiber optic cable.

16. The cover assembly of claim 15, wherein the lid includes a second strip of resilient deformable material adjacent the opening through which the fiber optic cable extends, the strip of deformable material being configured to engage the second strip of deformable material so that the fiber optic cable extends between the strip and the second strip, and the strips of deformable material cooperating to form a seal about the fiber optic cable.

17. A cover assembly for a fiber optic connector comprising:

the fiber optic connector mounted to an end of and terminating a fiber optic cable, the fiber optic connector including a ferrule;

a cover including a box and a lid that cooperate to define a cavity that is sized and configured to receive the fiber optic connector, the cover also defining an opening through which the fiber optic cable extends when the fiber optic connector is received within the cavity, the box and the lid being configured to seal together to inhibit contamination of the ferrule of the fiber optic connector from outside the cover;

wherein the lid includes a strip of resilient deformable material adjacent the opening through which the fiber optic cable extends, the deformable material cooperating with the box to form a seal about the fiber optic cable.

18. A method of sealing a telecommunications connector against airborne contaminants comprising:

terminating a fiber optic cable with a fiber optic connector in a clean environment protected against airborne contaminants, with an end of an optical fiber within the cable terminated at a polished end face of a ferrule of the connector;

within the clean environment, placing the fiber optic connector within a cover including an open sided box and a lid, the lid being sized to fit within the open side of the box and to seal a cavity defined by the lid and the box against entry of airborne contaminants;

routing the fiber optic cable out of the cavity through an opening defined in the cover; and closing the cover by engaging the lid with the open side of the box;

transporting the telecommunications connector to a location where a fiber optic communications linkage is desired;

removing the cover from the fiber optic connector; and making the fiber optic communications linkage without cleaning the end face of the ferrule.

* * * * *